United States Patent

Joyce

(10) Patent No.: US 9,466,290 B2
(45) Date of Patent: Oct. 11, 2016

(54) SYSTEMS AND METHODS FOR AVIATION COMMUNICATION MONITORING USING SPEECH RECOGNITION

(71) Applicant: Honeywell International Inc., Morristown, NJ (US)

(72) Inventor: Jim Joyce, Olathe, KS (US)

(73) Assignee: Honeywell International Inc., Morris Plains, NJ (US)

(*) Notice: Subject to any disclaimer, the term of this patent is extended or adjusted under 35 U.S.C. 154(b) by 221 days.

(21) Appl. No.: 14/270,519

(22) Filed: May 6, 2014

(65) Prior Publication Data

US 2016/0078862 A1 Mar. 17, 2016

(51) Int. Cl.
| | |
|---|---|
| *G10L 21/00* | (2013.01) |
| *G10L 15/26* | (2006.01) |
| *G10L 15/04* | (2013.01) |
| *G10L 15/00* | (2013.01) |
| *G10L 15/08* | (2006.01) |
| *G10L 15/22* | (2006.01) |

(52) U.S. Cl.
CPC .............. *G10L 15/08* (2013.01); *G10L 15/22* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 6,011,854 A | 1/2000 | Van Ryzin | |
| 6,332,120 B1 | 12/2001 | Warren | |
| 7,415,326 B2 | 8/2008 | Komer et al. | |
| 7,606,715 B1* | 10/2009 | Krenz | ............................ 704/275 |
| 7,881,832 B2* | 2/2011 | Komer | .................... G10L 15/26 |
| | | | 244/222 |
| 7,912,592 B2 | 3/2011 | Komer et al. | |
| 7,949,319 B2* | 5/2011 | Tuttle | ..................... H04H 40/18 |
| | | | 455/189.1 |
| 8,195,115 B2* | 6/2012 | Tuttle | ..................... H04H 40/18 |
| | | | 455/189.1 |
| 9,230,549 B1* | 1/2016 | Popik | ...................... G10L 15/30 |
| 2013/0042268 A1* | 2/2013 | Woo | ........................ G09B 5/06 |
| | | | 725/37 |
| 2016/0019891 A1* | 1/2016 | Martinez | ................. G10L 15/22 |
| | | | 704/275 |

* cited by examiner

*Primary Examiner* — Satwant Singh
(74) *Attorney, Agent, or Firm* — Fogg & Powers LLC

(57) ABSTRACT

Systems and methods for aviation communication monitoring using speech recognition are provided. In one embodiment, a method for multichannel avionics communication is provided. The method comprises: configuring a software defined radio to generate digitized audio data for a plurality of voice communication channels; audibly reproducing voice communication received over a first channel of the plurality of voice communication channels; applying a trigger word speech recognition algorithm to at least a second channel of the plurality of voice communication channels to detect a message containing a trigger word; and when a trigger word is detected, storing a communication containing the trigger word and generating an alert.

20 Claims, 2 Drawing Sheets

SYSTEMS AND METHODS FOR AVIATION COMMUNICATION MONITORING USING SPEECH RECOGNITION

BACKGROUND

Currently, aircraft are equipped with a voice communication radio which can be tuned to a single frequency. That single frequency is what the aircraft's pilot monitors. Although it is common to have multiple on-board radios, the pilot is limited to listening only to the frequency that a particular radio is tuned to. If another aircraft, or a ground station, attempts to contact the pilot on a frequency which the pilot has not selected, the pilot will miss that communication.

For the reasons stated above and for other reasons stated below which will become apparent to those skilled in the art upon reading and understanding the specification, there is a need in the art for improved systems and methods for aviation communication monitoring.

SUMMARY

The Embodiments of the present invention provide methods and systems for aviation communication monitoring using speech recognition and will be understood by reading and studying the following specification.

Systems and methods for aviation communication monitoring using speech recognition are provided. In one embodiment, a method for multichannel avionics communication is provided. The method comprises: configuring a software defined radio to generate digitized audio data for a plurality of voice communication channels; audibly reproducing voice communication received over a first channel of the plurality of voice communication channels; applying a trigger word speech recognition algorithm to at least a second channel of the plurality of voice communication channels to detect a message containing a trigger word; and when a trigger word is detected, storing a communication containing the trigger word and generating an alert.

DRAWINGS

Figure 1:
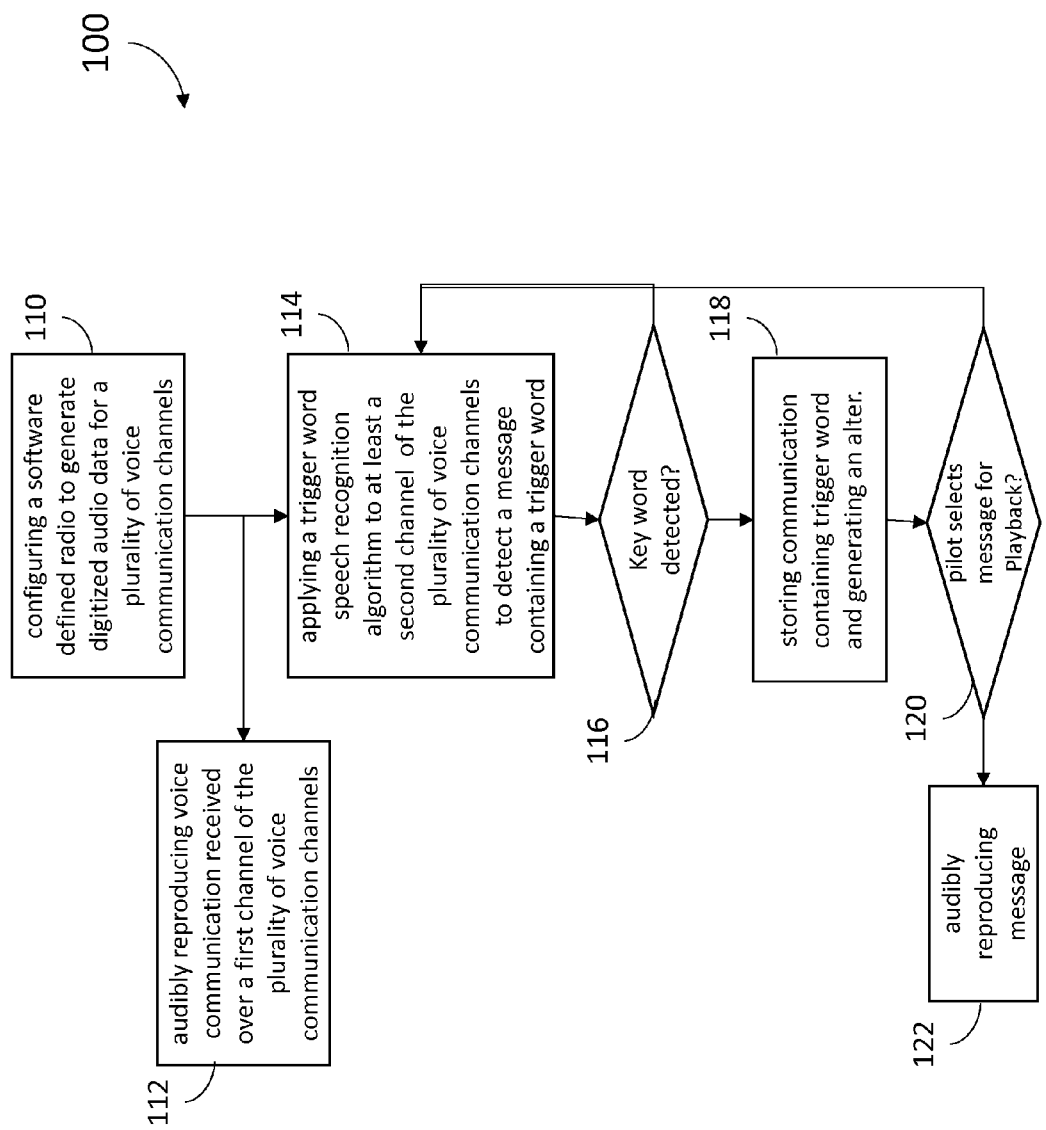
Figure 2:
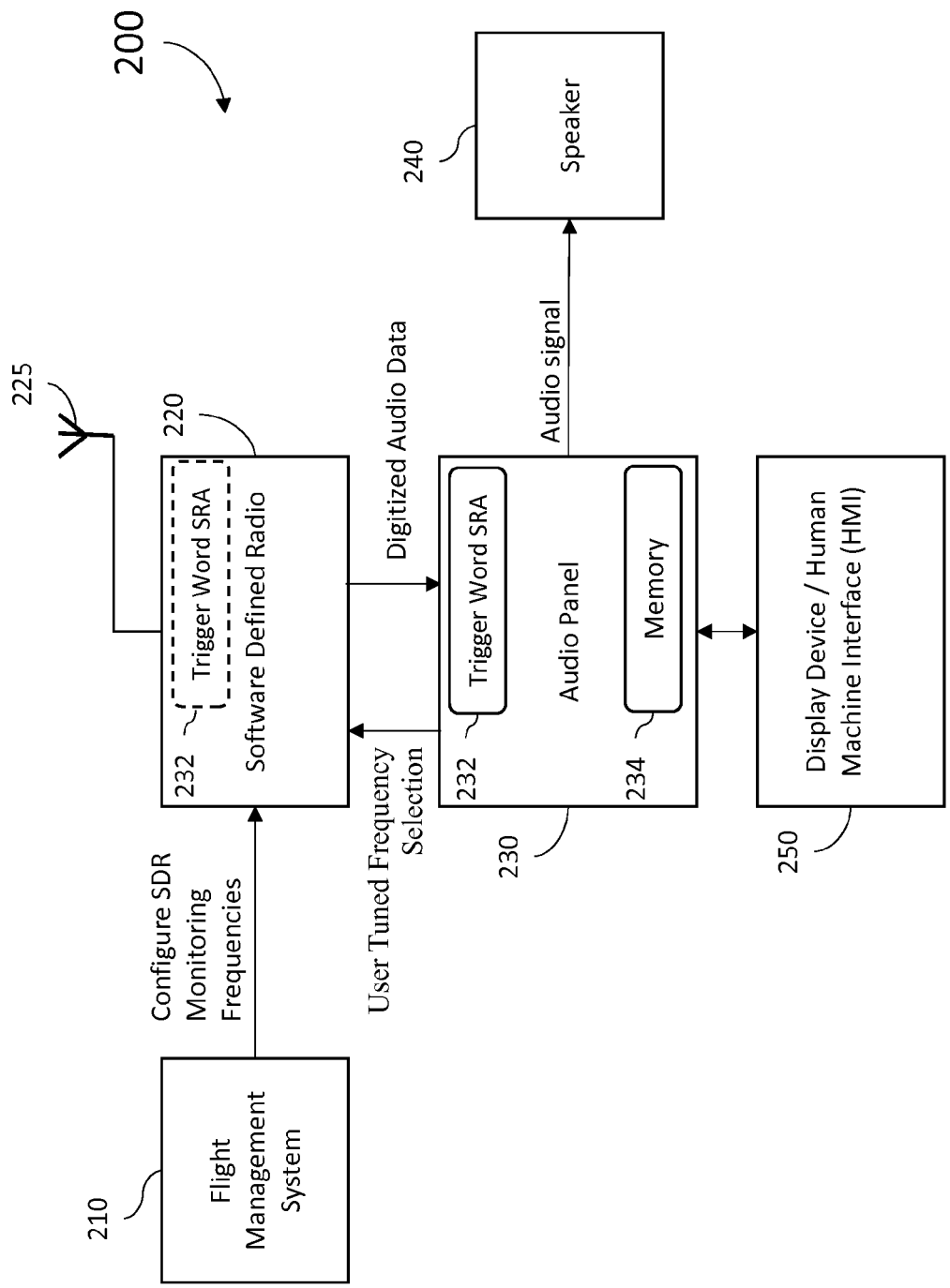

Embodiments of the present invention can be more easily understood and further advantages and uses thereof more readily apparent, when considered in view of the description of the preferred embodiments and the following figures in which:

FIG. 1 is a flow chart illustrating a method of one embodiment of the present disclosure; and FIG. 2 is a block diagram illustrating a system of one embodiment of the present disclosure.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention take advantage of developments in software define radio (SDR) systems to provide a radio communication system for aircraft that can monitor multiple radio channels in addition to the radio channel actively selected by the pilot to listen to. For specifically, embodiments of the present disclosure application of speech recognition technology in the aircraft environment to improve the pilot's situational awareness by alerting the pilot when relevant information is spoken on frequencies that he is not listening to. Speech recognition processes will monitor relevant voice communications (COM) radio frequencies for certain key words. That is, speech recognition processes will monitor frequencies of voice channels different from the channel that the pilot had currently selected. Example of frequencies which may be monitored using speech recognition include emergency channels, the last frequency that the pilot was tuned to prior to a control center handoff, a frequency for the next anticipated control center handoff, Universal Communications (Unicom) stations, and the like. For example, in one implementation, an embodiment of the present disclosure may be used to monitor a Ground Control station after an aircraft has been handed off to a Control Tower. Similarly, an embodiment of the present disclosure could be used to continue to monitor a Departure frequency after being handed off to an Air Route Traffic Control Center (ARTCC) controller. In both such implementations, if a controller attempts to contact the pilot using the frequency to which he was tuned prior to handoff, the pilot would no longer hear the attempt in the cockpit because he had tuned to a new frequency. However, embodiments of the present disclosure will continue to monitor those prior frequencies using speech recognition, and alert the pilot if a keyword is recognized. Similarly, embodiments of the present disclosure may also work in anticipation of a next handoff and could similarly monitor those frequencies using speech recognition before the pilot tunes the radio to that frequency. In each case, the system can automatically select the frequencies to monitor in the background, without requiring input from the pilot. As the terms are used within the context of this disclosure, the terms "channel" and "frequency" should be considered synonymous. Further, although the term "pilot" is used through-out to refer to an example user, the term is not intended to be limiting. That is, any task, function, selection, etc., described herein as being associated with a pilot action could in fact be performed by any user regardless of whether the user is a pilot or non-pilot.

FIG. 1 is a flow chart illustrating a multi-channel communication event monitoring method 100 of one embodiment of the present invention. The method begins at 110 with configuring a software defined radio to generate digitized audio data for a plurality of voice communication channels. The software defined radio receives and digitally samples over-the air radio frequency (RF) carrier signals received by the aircraft's antenna within a given RF spectrum. The software defined radio then digitally down converts and demodulates the carrier signals to baseband to produce a stream of digitized audio data for each of the plurality of voice communication channels. One of the plurality of voice communication channels is the "user tuned frequency" that the pilot has selected and is actively listening to. The balance of the plurality of voice communication channels are referred to herein as "monitored frequencies"

since they are the channels being monitored in the background for potentially relevant communication events.

The method proceeds to 112 with audibly reproducing voice communication received over a first channel of the plurality of voice communication channels. That is, the voice communications received on the "user tuned frequency" are played over a speaker so that the pilot can actively listen to the communications channel he has selected. The speaker would normally be in a headset worn by pilot, but in other embodiments it may be any speaker which can be heard by the flight crew. The method also proceeds to 114 with applying a trigger word speech recognition algorithm to at least a second channel of the plurality of voice communication channels to detect a message containing a trigger word. That is, for one or more other communication channels, the digitized audio data produced by the software defined radio is run through a speech recognition algorithm to detect whether trigger words are being mentioned. Trigger words can be any word or phrase that might carry a notion of importance and/or relevance to the pilot. For example, in on implementation, the set of trigger words monitored by the speech recognition algorithm may include either the tail number of the aircraft or it's flight number. The set of trigger words may also include words such as "emergency". Mention of such trigger words on the monitored frequencies would be an indication that a potentially relevant communication is taking place on a channel other than the user tuned frequency. When a word or phrase from the set of trigger words is detected in a communication over a monitored frequency (determined at block 116) then that communication represents a potentially relevant communication event. In that case the method proceeds to 118 with storing the communication containing the trigger word and generating an alert. That is, when one of the set of trigger words is detected over a monitored frequency, then the pilot is alerted that a potentially relevant communication event has occurred over one of the monitored frequencies.

The alert may come as a displayed message on a cockpit display device, an audible alert tone, or a combination of both. After the alert is provided, the pilot decides whether or not to listen to the recorded communication event. Requiring positive action by the pilot avoids confusion in the cockpit as to the source of where audible messages heard in the cockpit are coming from. For example, in the case of an emergency, the pilot may be already fully engaged and working on emergency procedures. Unexpected automatic playing of a recorded communication event may cause confusion or possibly distract the pilot from performing a critical task.

If the pilot decides to listen to the potentially relevant communication (checked at 120), then the method proceeds to 122 with audibly reproducing message. For example, the pilot may indicate his decision to listen to the stored communication by entering a selection at a human-machine interface device, such as a multifunction display (MFD) unit or a Navigator console (discussed below). The communication would then be recalled from memory and played to the pilot, for example, over a cockpit speaker. In one embodiment, the stream of digitized audio data is buffered so that the pilot can listen to at least a portion of the communication that occurred prior to occurrence of the trigger word.

FIG. 2 is a block diagram illustrating generally at 200 an on-board system for implementing a multi-channel communication event monitoring method such as illustrated in FIG. 1. System 200 comprises a flight management system (also referred to as a flight management computer), a software refined radio unit, an antenna, an audio panel, at least one speaker, and at least one display device.

As mentioned above, software defined radio 220 digitally samples RF carrier signals received by the aircraft's antenna 225 within a given communication spectrum and then digitally down converts and demodulates the carrier signals to baseband to produce the digitized audio data for the monitored frequencies and the user tuned frequency. In one embodiment, the pilot selects the user tuned frequency, for example, by using controls available on the audio panel. The flight management system 210 configures the software defined radio 220 as to what frequencies belong to the set of monitored frequencies. These would be those frequencies, in addition to the user tuned frequency, which are most likely to carry a potentially relevant communication event.

The digitized audio data is provided to the audio panel 230. For the user tuned frequency, the audio panel 230 converts the digitized audio data associated with the user tuned frequency to an audio signal which audibly plays voice communication from that frequency over speaker 240. In some embodiments, the speaker 240 may be a speaker in a headset worn by pilot, but in other embodiments it may be any speaker which can be heard by the flight crew.

The trigger word speech recognition algorithm may be executed either by a processor in the audio panel 230 (shown at 232 within audio panel 230) or alternatively by a processor in the software defined radio 220 (shown at 232 within software defined radio 220). The trigger word speech recognition algorithm is applied to the digitized audio data associated with the monitored frequencies to detect when a potentially relevant communication event has occurred over one of the monitored frequencies. For example, in one embodiment the trigger word speech recognition algorithm 232 parses the digitized audio data and compares words or phrases extracted from the stream of digitized audio data to the set of trigger words. When the trigger word speech recognition algorithm 232 detects a trigger word, the digitized audio data for the communication in which the trigger word was detected is stored to memory 234. In addition, when the process detects a trigger word, a relevant communication event notification is generated to the pilot. In one embodiment, the relevant communication event notification may comprise an audible alert or tone generated in the cockpit, such as through speaker 240 for example. In other embodiments, the relevant communication event notification may instead, or also, comprise a message displayed via display device 250.

In one embodiment, display device 250 comprises a human machine interface such as an aircraft's multifunction display (MFD) or a Navigator console. In that case, a message is displayed on the device 250 alerting the pilot of the relevant communication event and providing the pilot with a selection input to either access the stored communication, or clear the event notification. In one embodiment, the display device 250 further displays to the pilot the trigger word contained in the stored communication that caused trigger word speech recognition algorithm 232 to define the communication as a potentially relevant communication event.

In one embodiment, the stream of digitized audio data for the stored event is buffered in memory 234 so that the pilot can listen to at least a portion of the communication that occurred prior to occurrence of the trigger word. The digitalized audio data may be buffered for a set period of time prior to and/or after the trigger word. Alternatively, trigger word speech recognition algorithm 232 may detect pauses or blank spaces in the communication and start replaying the stored event to the pilot at the nearest detected blank space prior to occurrence of the trigger word. That way, if the buffer is silent from a period of time (say 1 minute) prior to the trigger word, the pilot does not need to listen to a minute of silence before being allowed to hear the relevant voice communication.

As mentioned above, selection of which frequencies should be included in the set of monitored frequencies is performed by the flight management system 210. The flight management system 210 can automatically select the set of monitored frequencies based on various factors including, but not limited to, aircraft position and fight stage (i.e., departure, ascent, cruising, descent, landing). Other examples of frequencies which may be selected as monitored frequencies include, but are not limited to, emergency channels, the last frequency that the pilot was tuned to prior to a control center handoff, the last frequency that the pilot was tuned to prior to a manual frequency change, a frequency for the next anticipated control center handoff, nearby Universal Communications (Unicom) stations, and the like.

Example Embodiments

Example 1 comprises a multichannel avionics communication system, the system comprising: a software defined radio coupled to an antenna, where the software defined radio produces digitized audio data for a plurality of voice communication channels based on digital samples of radio frequency (RF) carrier signals received by the antenna; an audio panel device coupled to the software defined radio and at least one speaker, wherein using the at least one speaker, the audio panel device audibly reproduces voice communication received over a first channel of the plurality of voice communication channels, the first channel corresponding to a user selected tuned frequency; a processor executing a trigger word speech recognition algorithm to at least a second channel of the plurality of voice communication channels to detect a message containing a trigger word, the at least a second channel corresponding to a monitored frequency; wherein when the trigger word speech recognition algorithm detects a trigger word, a communication associated with the trigger word and received on the at least a second channel is stored into a memory and an alert is generated.

Example 2 includes the system of example 1, wherein either the software defined radio or the audio panel device comprises the processor executing the trigger word speech recognition algorithm.

Example 3 includes the system of any of examples 1-2, wherein the alert comprises an audible alert.

Example 4 includes the system of any of examples 1-3, wherein the alert comprises a message displayed on a display device.

Example 5 includes the system of example 4, wherein the message displayed on the display device includes an indication identifying the trigger word.

Example 6 includes the system of any of examples 4-5, wherein the display device comprises an avionics multi-function display (MFD) unit or an avionics Navigator console.

Example 7 includes the system of any of examples 1-6, further comprising a human-machine interface device providing a selection option for a user to recall and listen to the stored communication associated with the trigger word.

Example 8 includes the system of example 7, the memory including a buffer storing the digitized audio data so that the user can listen to at least a portion of the communication that occurred prior to occurrence of the trigger word.

Example 9 includes the system of any of examples 1-8, further comprising: a flight management system coupled to the software defined radio, wherein the flight management system configures the software defined radio as to which RF carrier signals corresponding are included in a set of monitored frequencies.

Example 10 includes the system of example 9, wherein the flight management system automatically selects the set of monitored frequencies to include at least one of: an emergency channel; a prior channel that was a previous user selected tuned frequency; a channel that is a next anticipated control center handoff; or a Universal Communications (Unicom) stations.

Example 11 includes the system of any of examples 9-10, wherein the flight management system automatically selects the set of monitored frequencies based on at least one of: an aircraft position; or a flight stage for the aircraft.

Example 12 includes a method for multichannel avionics communication, the method comprising: configuring a software defined radio to generate digitized audio data for a plurality of voice communication channels; audibly reproducing voice communication received over a first channel of the plurality of voice communication channels; applying a trigger word speech recognition algorithm to at least a second channel of the plurality of voice communication channels to detect a message containing a trigger word; and when a trigger word is detected, storing a communication containing the trigger word and generating an alert.

Example 13 includes the method of example 12, further comprising: audibly reproducing the communication when a user selects the communication for playback.

Example 14 includes the method of any of examples 12-13, wherein the trigger word speech recognition algorithm is implemented either: by a processor of the software defined radio; or by a processor of an audio panel.

Example 15 includes the method of any of examples 12-14, wherein generating an alert comprises one or both of: generating an audible alert; and displaying a message on a display device.

Example 16 includes the method of example 15, wherein the message displayed on the display device includes an indication identifying the trigger word.

Example 17 includes the method of example 15, wherein displaying the message on the display device further comprises: providing a selection option for a user to recall and listen to the stored communication associated with the trigger word.

Example 18 includes the method of any of examples 12-17, wherein configuring the software defined radio to generate digitized audio data for a plurality of voice communication channels further comprises: identifying to the software defined radio a set of monitored frequencies that include at least one of: an emergency channel; a prior channel that was a previous user selected tuned frequency; a channel that is a next anticipated control center handoff; or a Universal Communications (Unicom) stations.

Example 19 includes the method of any of examples 12, wherein configuring the software defined radio to generate digitized audio data for a plurality of voice communication channels is based on one of both of: an aircraft position; or a flight stage for the aircraft.

Example 20 includes the method of any of examples 12, further comprising: buffering the digitized audio data so that a user can listen to at least a portion of the communication that occurred prior to occurrence of the trigger word.

Several means are available to implement the various system and process embodiments discussed in this specification. These means include, but are not limited to programmable hardware including digital computer systems, microprocessors, programmable controllers and field programmable gate arrays. For example the trigger word speech recognition algorithm may be implemented by one or more computer processors executing software corresponding to the elements and modules described above and/or performing the described processes. Therefore other embodiments of the present disclosure include program instructions resident on computer readable media which when implemented by such programmable hardware, enable them to implement said embodiment. As used herein, the term "computer readable media" refers to tangible memory storage devices having physical forms. Such physical forms may include any form of computer memory device, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A multichannel avionics communication system, the system comprising:
    a software defined radio coupled to an antenna, where the software defined radio produces digitized audio data for a plurality of voice communication channels based on digital samples of radio frequency (RF) carrier signals received by the antenna;
    an audio panel device coupled to the software defined radio and at least one speaker, the audio panel device receiving the digitized audio data for the plurality of voice communication channels, wherein using the at least one speaker, the audio panel device audibly reproduces, from a first portion of the digitized audio data, voice communication received over a first channel of the plurality of voice communication channels, the first channel corresponding to a user selected tuned frequency; and
    a processor executing a trigger word speech recognition algorithm that receives the digitized audio data and processes at least a second channel of the plurality of voice communication channels from a second portion of the digitized audio data to detect a message containing a trigger word, the at least a second channel corresponding to a monitored frequency;
    wherein when the trigger word speech recognition algorithm detects a trigger word, a communication associated with the trigger word and received on the at least a second channel is stored into a memory and an alert is generated.

2. The system of claim 1, wherein either the software defined radio or the audio panel device comprises the processor executing the trigger word speech recognition algorithm.

3. The system of claim 1, wherein the alert comprises an audible alert.

4. The system of claim 1, wherein the alert comprises a message displayed on a display device.

5. The system of claim 4, wherein the message displayed on the display device includes an indication identifying the trigger word.

6. The system of claim 4, wherein the display device comprises an avionics multi-function display (MFD) unit or an avionics Navigator console.

7. The system of claim 1, further comprising a human-machine interface device providing a selection option for a user to recall and listen to the stored communication associated with the trigger word.

8. The system of claim 7, the memory including a buffer storing the digitized audio data so that the user can listen to at least a portion of the communication that occurred prior to occurrence of the trigger word.

9. The system of claim 1, further comprising:
    a flight management system coupled to the software defined radio, wherein the flight management system configures the software defined radio as to which RF carrier signals corresponding are included in a set of monitored frequencies.

10. The system of claim 9, wherein the flight management system automatically selects the set of monitored frequencies to include at least one of:
    an emergency channel;
    a prior channel that was a previous user selected tuned frequency;
    a channel that is a next anticipated control center handoff; or
    a Universal Communications (Unicom) stations.

11. The system of claim 9, wherein the flight management system automatically selects the set of monitored frequencies based on at least one of:
    an aircraft position; or
    a flight stage for the aircraft.

12. A method for multichannel avionics communication, the method comprising:
    configuring a software defined radio to generate digitized audio data for a plurality of voice communication channels;
    audibly reproducing voice communication received over a first channel of the plurality of voice communication channels from a first portion the digitized audio data;
    applying a trigger word speech recognition algorithm to at least a second channel of the plurality of voice communication channels from a second portion of the digitized audio data to detect a message containing a trigger word; and
    when a trigger word is detected, storing a communication containing the trigger word and generating an alert.

13. The method of claim 12, further comprising:
    audibly reproducing the communication when a user selects the communication for playback.

14. The method of claim 12, wherein the trigger word speech recognition algorithm is implemented either:
    by a processor of the software defined radio; or
    by a processor of an audio panel.

15. The method of claim 12, wherein generating an alert comprises one or both of:
    generating an audible alert; and
    displaying a message on a display device.

16. The method of claim 15, wherein the message displayed on the display device includes an indication identifying the trigger word.

17. The method of claim 15, wherein displaying the message on the display device further comprises:
providing a selection option for a user to recall and listen to the stored communication associated with the trigger word.

18. The method of claim 12, wherein configuring the software defined radio to generate digitized audio data for a plurality of voice communication channels further comprises:
identifying to the software defined radio a set of monitored frequencies that include at least one of:
an emergency channel;
a prior channel that was a previous user selected tuned frequency;
a channel that is a next anticipated control center handoff; or
a Universal Communications (Unicom) stations.

19. The method of claim 12, wherein configuring the software defined radio to generate digitized audio data for a plurality of voice communication channels is based on one of both of:
an aircraft position; or
a flight stage for the aircraft.

20. The method of claim 12, further comprising:
buffering the digitized audio data so that a user can listen to at least a portion of the communication that occurred prior to occurrence of the trigger word.

* * * * *